United States Patent
Palm et al.

(10) Patent No.: US 7,277,417 B2
(45) Date of Patent: Oct. 2, 2007

(54) LOW POWER PROTOCOL FOR WIRELESS TERMINAL PEER-TO-PEER COMMUNICATIONS

(75) Inventors: Stephen Palm, Irvine, CA (US); Edward H. Frank, Atherton, CA (US); Bruce E. Edwards, Belmont, MA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 814 days.

(21) Appl. No.: 10/771,532

(22) Filed: Feb. 4, 2004

(65) Prior Publication Data

US 2004/0218620 A1    Nov. 4, 2004

Related U.S. Application Data

(60) Provisional application No. 60/466,377, filed on Apr. 29, 2003.

(51) Int. Cl.
*H04Q 7/24*    (2006.01)

(52) U.S. Cl. ........................................ 370/338; 370/311

(58) Field of Classification Search ................ 370/310, 370/311, 351–356, 338, 349; 455/574, 127.5
See application file for complete search history.

(56) References Cited

U.S. PATENT DOCUMENTS

| | | | |
|---|---|---|---|
| 2005/0276255 A1* | 12/2005 | Aiello et al. | 370/348 |
| 2006/0072488 A1* | 4/2006 | Meier | 370/312 |
| 2006/0092868 A1* | 5/2006 | Meier | 370/312 |
| 2006/0280140 A9* | 12/2006 | Mahany et al. | 370/329 |
| 2007/0058665 A1* | 3/2007 | Ho et al. | 370/447 |

* cited by examiner

*Primary Examiner*—Ajit Patel
(74) *Attorney, Agent, or Firm*—Garlick Harrison & Markison; Bruce E. Garlick

(57) ABSTRACT

A Wireless Local Area Network (WLAN) system in which wireless terminals each operate upon battery power. One of the wireless terminals acts as a Master to coordinate the transmission and receptions of the Slaves so as to reduce the power consumed by all of the devices. The Slaves operate according to a power up and power down sequence to conserve battery power. Further, the terminals may alternate between being Slaves and being the Master to equalize battery consumption of the wireless terminals.

29 Claims, 5 Drawing Sheets

LOW POWER PROTOCOL FOR WIRELESS TERMINAL PEER-TO-PEER COMMUNICATIONS

CROSS REFERENCE TO RELATED APPLICATION

This application claims priority to U.S. Provisional Application Ser. No. 60/466,377, filed Apr. 29, 2003, which is incorporated herein by reference in its entirety for all purposes.

BACKGROUND OF THE INVENTION

1. Field of the Invention

This invention relates generally to wireless local area networks; and more particularly to a protocol for peer-to-peer communications of wireless terminals.

2. Background of the Invention

Communication technologies that link electronic devices in a networked fashion are well known. Examples of communication networks include wired packet data networks, wireless packet data networks, wired telephone networks, wireless telephone networks, and satellite communication networks, among other networks. These communication networks typically include a network infrastructure that services a plurality of client devices. Wired Local Area Networks (LANs), e.g., Ethernets, are quite common and support communications between networked computers and other devices within a serviced area. LANs also often link serviced devices to Wide Area Networks (WANs) and the Internet. Each of these networks is generally considered a "wired" network, and the devices on those networks have essentially unlimited power supplies since they are connected to a wired power source.

Wireless networks have been in existence for a relatively shorter period. Cellular telephone networks, wireless LANs (WLANs), and satellite communication networks, among others, are examples of wireless networks. Relatively common forms of WLANs are IEEE 802.11(a) networks, IEEE 802.11(b) networks, and IEEE 802.11(g) networks, referred to jointly as "IEEE 802.11 networks." IEEE 802.11 networks may operate either in Infrastructure Mode or in Ad Hoc mode. In Infrastructure Mode, a single node, termed an Access Point (AP), coordinates the actions of the other nodes and typically provides a connection to a wired network. In Ad Hoc mode, where an AP is not present, the wireless nodes jointly coordinate the WLAN. In IEEE 802.11 networks, the nodes may coordinate in one of two possible methods: the Distributed Control Function (DCF) or the Point Control Function (PCF). It is generally assumed that a Point Coordinator (PC) that provides the PCF is an AP within an IEEE 802.11 network operating in Infrastructure Mode.

WLANs provide significant advantages when servicing portable devices such as portable computers, portable data terminals, portable game terminals and other devices that are neither typically stationary nor tethered to power. Because these devices are battery powered, it is advantageous for these devices to turn off their radios and processing blocks as often as possible to conserve power. When an AP services the WLAN, the AP is usually tethered to a LAN connection and is connected to a wired power source. The AP therefore can continuously provide the PCF without interruption. However, in an Ad Hoc network, each of the WLAN devices is a peer such that none of the devices serves as an AP. Ad Hoc networks may require transmission coordination similar to that provided by the IEEE 802.11 PCF since all of the devices are peers. In a traditional system, the transmitter and receiver of the PC typically remain constantly powered via a wired source. In an Ad Hoc network, all devices may be battery powered so that none of the devices may reasonably service the PCF.

In the current IEEE 802.11 specification when operating in the PCF mode, devices (CF-pollable STA) may only transmit data when they have received a poll from the PC. After the device has transmitted its data, it expects to receive an acknowledgement message. If the data frame is not in turn acknowledged, the CF-Pollable STA shall not retransmit the frame unless the PC polls it again, or it decides to retransmit during the Contention Period (CP). (Section 9.3 of IEEE 802.11 specification.) Thus the specified PC may receive transmissions when it is not powered and/or the PC may unnecessarily remain powered awaiting potential retransmissions.

Thus, there is a need in the art for improvements in protocols for WLAN peer devices that not only coordinate transmissions of peers that results in reduced power consumption, but that supports robust data throughput.

SUMMARY OF THE INVENTION

In order to overcome the shortcomings of the prior systems and methods of operation, a method according to the present invention manages peer-to-peer communications in a wireless Local Area Network (WLAN) among a plurality of wireless terminals using a unique frame cycle.

The frame cycle includes a beaconing period, a broadcast data period, a plurality of polled data periods, and a contention period. One of the plurality of wireless terminals acts as a Master during each frame cycle and the remaining ones of the plurality of wireless terminals act as Slaves during each frame cycle. During the beaconing period, the Master transmits a beacon and each of the plurality of Slaves listens for the beacon. During the broadcast data period, the Master broadcasts data and each of the plurality of Slaves listens for the broadcast data. During each polled data period, the Master polls an assigned Slave and the assigned Slave transmits data to the Master if it has data to send. During the contention period, new Slaves that are present within the WLAN transmit to the Master in an attempt to become a member of the WLAN.

The frame cycle allows the wireless terminals to conserve battery life by powering down their transmitters and receivers during select periods of time. During the plurality of polled data periods, non-assigned Slaves power down their transmitters and receivers. During the contention period, the plurality of Slaves power down their transmitters and receivers also. Such is the case because during these periods the Slaves that are already members of the WLAN do not interface with the Master.

The method further includes optionally alternating mastering duties among the plurality of wireless terminals according to a round-robin mastering cycle. Because the round-robin mastering cycle does not require a single wireless terminal to be Master at all times, battery drain is distributed amongst all the wireless terminals of the WLAN. In one embodiment of the round-robin mastering cycle, none of the wireless terminals serves as the Master for consecutive frame cycles. In another embodiment of the round-robin mastering cycle, none of the wireless terminals serves as the Master for more than one frame cycle of the plurality of frame cycles. In still another embodiment of the round-robin mastering cycle, one of the wireless terminals acts as the Master for more than one consecutive frame cycle of the plurality of frame cycles.

During the beaconing period and the broadcast data period, at least one Slave of the plurality of Slaves powers down its respective transmitter because during the beaconing period and the broadcast data period the Slaves are not required to transmit to the Master. Each polled data period corresponds to a particular Slave of the plurality of Slaves. Polled data period assignments are broadcast to the plurality of Slaves during the beaconing period. Because each Slave knows its assigned polled data period, each Slave may power down its transmitter and receiver during non-assigned polled data periods. During assigned polled data periods, the Slaves power up their transmitters and receivers so that they can transmit data to the Master and receive acknowledgements from the Master.

The polled data period may be subdivided into a polling period, a data transmission period, and an acknowledgement period. With this subdivision, an assigned Slave ramps up power to its receiver prior to the polling period, ramps up power to its transmitter prior to the data transmission period, fully powers its transmitter and receiver during the data transmission period during which it transmits data to the Master, and powers down its transmitter during the acknowledgement period. During the acknowledgement period, the Slave keeps its receiver powered so that it can receive an acknowledgement from the Master. If such an acknowledgement is not received, the Slave will again transmit the data to the Master during the next frame cycle.

Moreover, other aspects of the present invention will become apparent with further reference to the drawings and specification, which follow.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE DRAWINGS

Figure 1A:
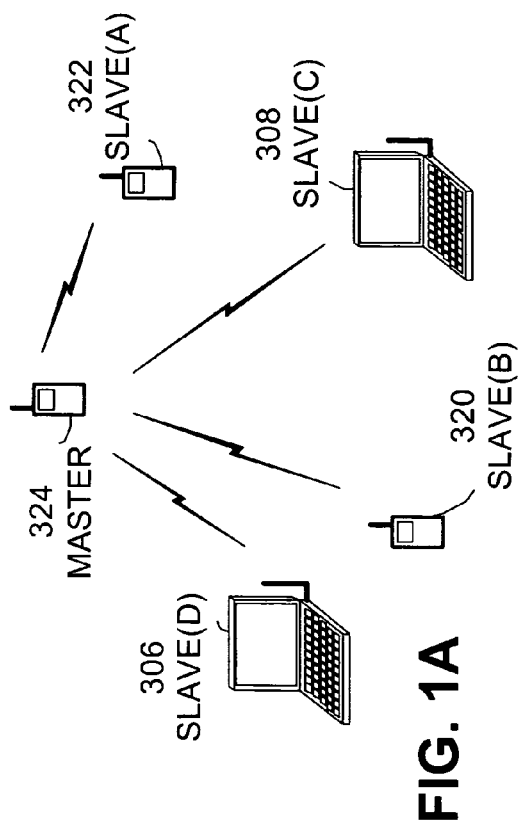
FIGS. 1A and 1B are system diagrams illustrating a plurality of wireless terminals and their operation generally according to an embodiment of the present invention.
Figure 1B:
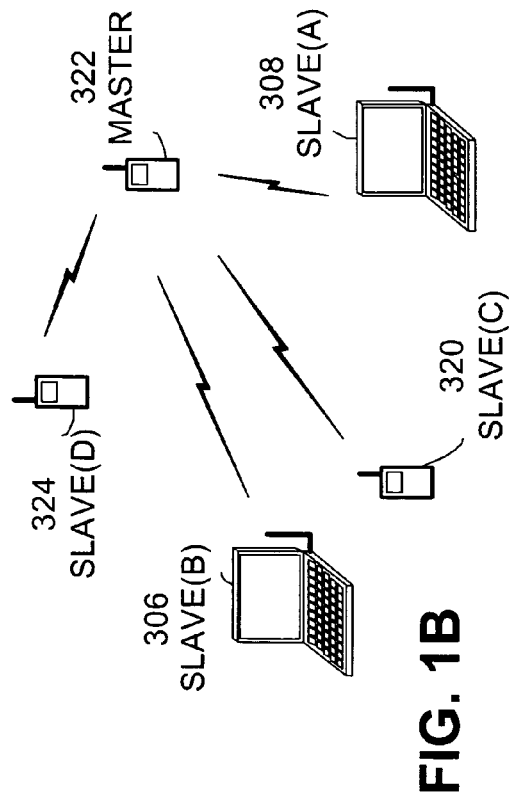

FIGS. 1A and 1B are system diagrams illustrating a plurality of wireless terminals and their operation generally according to an embodiment of the present invention. As shown in FIG. 1A, a wireless local area network (WLAN) includes a plurality of wireless terminals 306, 308, 320, 322, and 324. These wireless terminals operate according to the present invention such that during any frame cycle, one of the wireless terminals, e.g., wireless terminal 324, serves as the Master and remaining ones of the wireless terminals act as Slaves. This designation of Masters and Slaves remains in force for the particular frame cycle. When round-robin mastering is being used, the designation of the Master may change every frame cycle or may change every so often. With the round-robin mastering cycle of the present invention, each of the Slaves will typically serve as a Master for at least one frame cycle of the plurality of frame cycles of the round-robin mastering cycle.

If it is determined that one of the wireless terminals is tethered to a power source, e.g., laptop computer 306 or 308, the tethered wireless terminal may be the assigned Master while the device is tethered. This operation will reduce battery drain of the other wireless devices. Mastering assignment may be performed in an effort to distribute Mastering duties among the plurality of wireless terminals to uniformly drain the batteries of the wireless devices. In such case, wireless devices having comparatively longer battery lives will have greater Mastering duties.

FIG. 1B is a system diagram illustrating the wireless devices 306, 308, 320, 322, and 324. Comparing FIG. 1B from FIG. 1A, a new Master, wireless terminal 322, has been assigned for the particular frame cycle illustrated in FIG. 1B. In such case, wireless devices 306, 308, 320, and 324 operate as Slaves to the Master for the particular frame cycle. This designation of Masters and Slaves may continue for one or a plurality of frame cycles of the round-robin mastering cycle. The manner in which the wireless terminals of FIGS. 1A and 1B operate are described in more detail with reference to FIG. 2 through FIG. 5.

Figure 2:
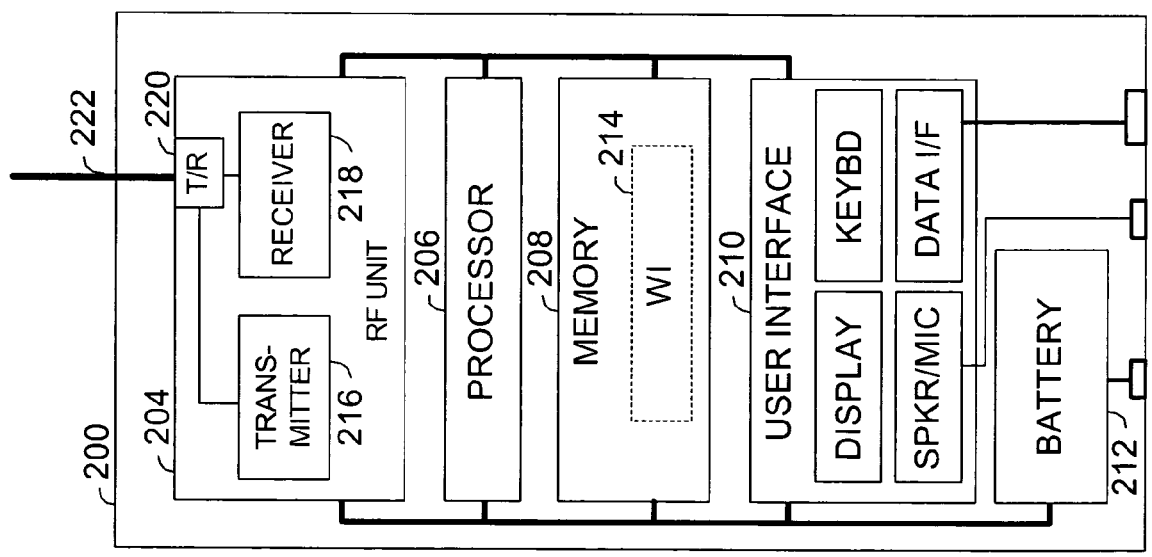
FIG. 2 is a block diagram illustrating a wireless terminal constructed according to the present invention.

FIG. 2 is a block diagram illustrating a wireless terminal constructed according to the present invention. A wireless terminal 200 includes an RF unit 204, a processor 206, a memory 208, and a user interface 210. The RF unit 204 couples to an antenna 222 that may be located internal or external to the case of the wireless terminal 200. In another embodiment, the wireless terminal 200 may include multiple antennas. The RF unit 204 includes a transmitter 216 and a receiver 218 that couple to the antenna 222 via a transmit/receive switch 220.

The processor 266 may be an Application Specific Integrated Circuit (ASIC) or another type of processor that is capable of operating the wireless terminal 200 according to the present invention. The memory 208 includes both static and dynamic components, e.g., DRAM, SRAM, ROM, EEPROM, etc. In some embodiments, the memory 208 may be partially or fully contained upon an ASIC that also includes the processor 206. A user interface 210 includes a display, a keyboard, a speaker/microphone, and/or a data interface, and may include other user interface components. The RF unit 204, the processor 206, the memory 208, and the user interface 210 couple via one or more communication buses/links. A battery 212 also couples to and powers the RF unit 204, the processor 206, the memory 208, and the user interface 210. The structure of the wireless terminal 200 illustrated is only an example of one wireless terminal structure. Many other varied wireless terminal structures could be operated according to the teachings of the present invention.

In performing the operations of the present invention, the wireless terminal 200 may execute software instructions, i.e., WLAN Instructions (WIs) 214. WIs 214 enable the wireless terminal 200 to perform the operations of the present invention. In executing the wireless instructions, the WIs 214 are loaded from memory 208 into the processor 206 for execution. In other embodiments, however, the wireless terminal 200 may operate according to the present invention based upon hardware function, firmware instructions, or a combination of any/all of these.

Figure 3:
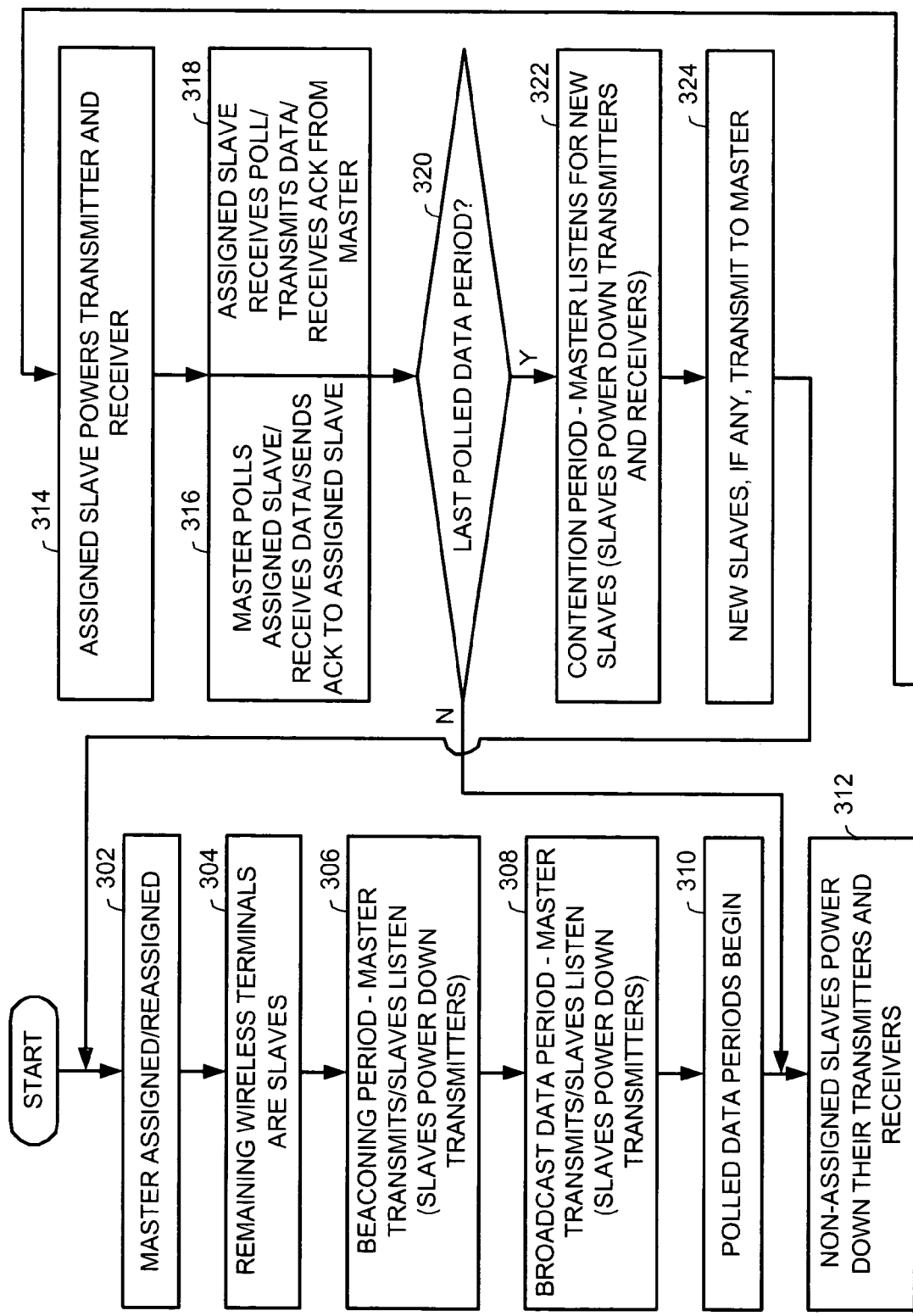
FIG. 3 is a flow diagram illustrating operation according to one embodiment of the present invention.

FIG. 3 is a flow diagram illustrating operation according to one embodiment of the present invention. As is illustrated in FIG. 3, during each frame cycle of the round-robin mastering cycle a Master is first assigned or reassigned (step 302). The determination of which wireless terminal of the WLAN to assign as the Master may be a very structured methodology in which each wireless terminal will serve as the Master for one or a plurality of frame cycles of the round-robin mastering cycle. Another technique may include a determination of which wireless terminals are best suited to be Masters and to use these wireless terminals as Masters while having other of the wireless terminals not serve as Masters during the round-robin mastering cycle. In any case, for the particular frame cycle of the round-robin mastering cycle, a Master will be assigned or reassigned.

For the particular frame cycle, remaining wireless terminals act as Slaves (step 304). With this Master and Slave designation process completed, operation enters the beaconing period in which the Master transmits a beacon and the Slaves listen to the beacon (step 306). During the beaconing period the Slaves may power down their transmitters to conserve battery life. With the beaconing period completed, operation of the frame cycle continues into the broadcast data period (step 308). In the broadcast data period, the Master transmits data and the Slaves listen for data and receive the data. During the broadcast data period, the Slaves may power down their transmitters because the transmitters are not required to respond to the data transmitted by the Master.

With the beaconing period and the broadcast data period completed, operation proceeds to the polled data period or periods (step 310). In one embodiment of operation, each frame cycle will include a polled data period for each Slave. During each polled data period, the Master sends a poll to each of the Slaves, and each Slave transmits data to the Master in response to the poll. The Master receives the data and, if the data is intended for another of the wireless terminals, transmits the data to an intended Slave during a subsequent frame cycle. Such transmission will occur when the device is again serving in the Master capacity and during the broadcast data period.

During the polled data period, non-assigned Slaves power down their transmitters and receivers (step 312). The non-assigned Slaves may do this because they wish to conserve power during the non-assigned polled data period. During the assigned polled data period, the assigned Slave powers its transmitter and receiver (step 314). Then, for the exchange between the Master and the Slave, the Master polls the assigned Slave, receives data from the assigned Slave, and sends an acknowledgement to the assigned Slave (step 316). Concurrently, the assigned Slave receives the poll from the Master, transmits data to the Master, and receives an acknowledgement from the Master (step 318).

Continuing with the operation of the frame cycle, the Master determines whether or not the last polled data period has been completed (step 320). If not, operation proceeds to the next assigned Slave in the polled data period (step 312). If the polled data period is complete, operation proceeds to the contention period in which, for example, the Master listens for new Slaves (step 322). The member Slaves may power down their transmitters and receivers during the contention period because they generally do not transmit to the Master nor receive from the Master. In one embodiment, member slaves may need to retransmit data during the contention phase. Non-member wireless terminals desiring entry into the WLAN transmit to the Master during the contention period, requesting admittance to the WLAN (step 324). In the contention period, the Master may power down its transmitter and leave its receiver powered during what is referred to as a new Slave waiting period. This is the period during which it is expected that any Slave requesting admittance to the WLAN will respond to the Master. From step 324 operation proceeds to step 302, where a new Master may be assigned or reassigned.

In most wireless devices, it takes some time for a receiver or transmitter to be fully stable and operational after power is applied to that block. According to some embodiments of the present invention, the receiver and/or transmitter is/are left powered during periods that do not require corresponding transmit or receive functionality. The blocks(s) are left powered during this/these period(s) so that the blocks(s) will function during a following interval when required.

Figure 4:
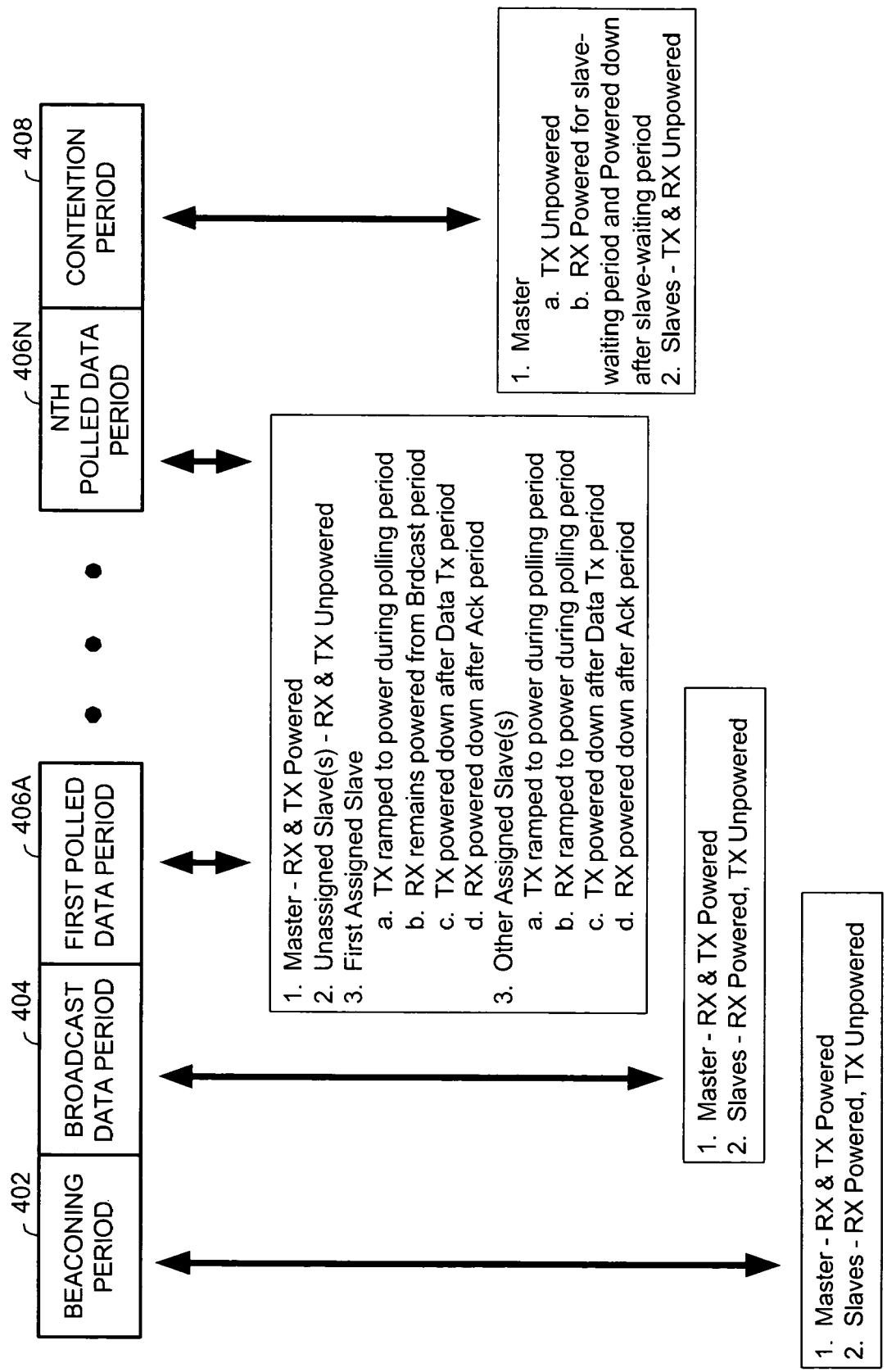
FIG. 4 is a block diagram illustrating the frame cycle division of an embodiment of the present invention.

FIG. 4 is a block diagram illustrating the frame cycle division of an embodiment of the present invention. The structure of FIG. 4 illustrates the various operations of the Masters and Slaves during the frame cycle division of the frame cycle. During the beaconing period 402, both of the Master's transmitter and receiver are powered. However, in other operations, the Master may not power its receiver because it is only transmitting during the beaconing period 402 and not listening. During the beaconing period 402, the Slaves must power their receivers, but their transmitters may not be powered in order to conserve battery life. During the broadcast data period 404, the Master has its transmitter and receiver powered. The Slaves, however, only receiving data from the Master, will have their receivers powered but not their transmitters powered.

The polled data periods will include a first polled data period 406A, a second polled data period, and so on through the "Nth" polled data period 406N. During each polled data period, there will be an assigned Slave and a plurality of unassigned Slaves. During each polled data period, the Master will have both its receiver and transmitter powered because it transmits a poll to the assigned Slave, waits for data from the assigned Slave, and transmits an acknowledgement to the assigned Slave. Thus, the polled data period may be subdivided into a polling period, a data transmission, and an acknowledgement period. During each polled data period, unassigned Slaves are neither receiving nor transmitting.

During the first polled data period 406A, a first assigned Slave may transmit data to the Master. Because the Slave has data to transmit and because it must also listen for the poll and for an acknowledgement, the Slave must have both its transmitter and receiver powered during at least some portions of the assigned poll data. Because the first assigned Slave had its receiver powered during the broadcast data period 404, the first assigned Slave leaves its receiver powered from the broadcast data period 404 through the first polled data period 406A. However, the first assigned Slave must power its transmitter for receipt of the pole from the Master. Thus, the first assigned Slave may ramp up its transmitter during the polling period at a sufficient rate to be ready just before the end of the incoming pole from the Master. During the data transmission period of the first poled data period 406A, the first assigned Slave transmits data to the Master. After this transmission is complete, the first assigned Slave may power down its transmitter. However, the first assigned Slave must keep its receiver powered up after the data transmission period so that it will receive the acknowledgement during the acknowledgement period. After the acknowledgement period, the first assigned Slave may power down its receiver.

During the other polled data periods, the assigned Slaves operate in a similar fashion. Because the other assigned Slaves have had their receivers and transmitters powered down during prior unassigned polled-data periods, they must ramp up power to their transmitters and receivers for their assigned polled-data periods. During the data transmission period, the transmitter and the receiver of the assigned Slave are both powered. However, after the data transmission period, the assigned Slave may ramp down or turn off power to its transmitter while keeping its receiver powered for the acknowledgement period. After the assigned polled data period has been completed, the assigned Slave may power down both its transmitter and its receiver.

The contention period 408 is the portion of the frame of the frame cycle in which new Slaves may request entry to the WLAN. In such case, the Master has only to listen for new Slaves and thus does not power its transmitter. The Master does power its receiver for a Slave-waiting period, during which new Slaves may request admittance to the WLAN. After the Slave-waiting period, the Master may power down its receiver, as well as its transmitter. During the contention period, all Slaves that are members of the WLAN will power down both their transmitters and their receivers.

Figure 5:
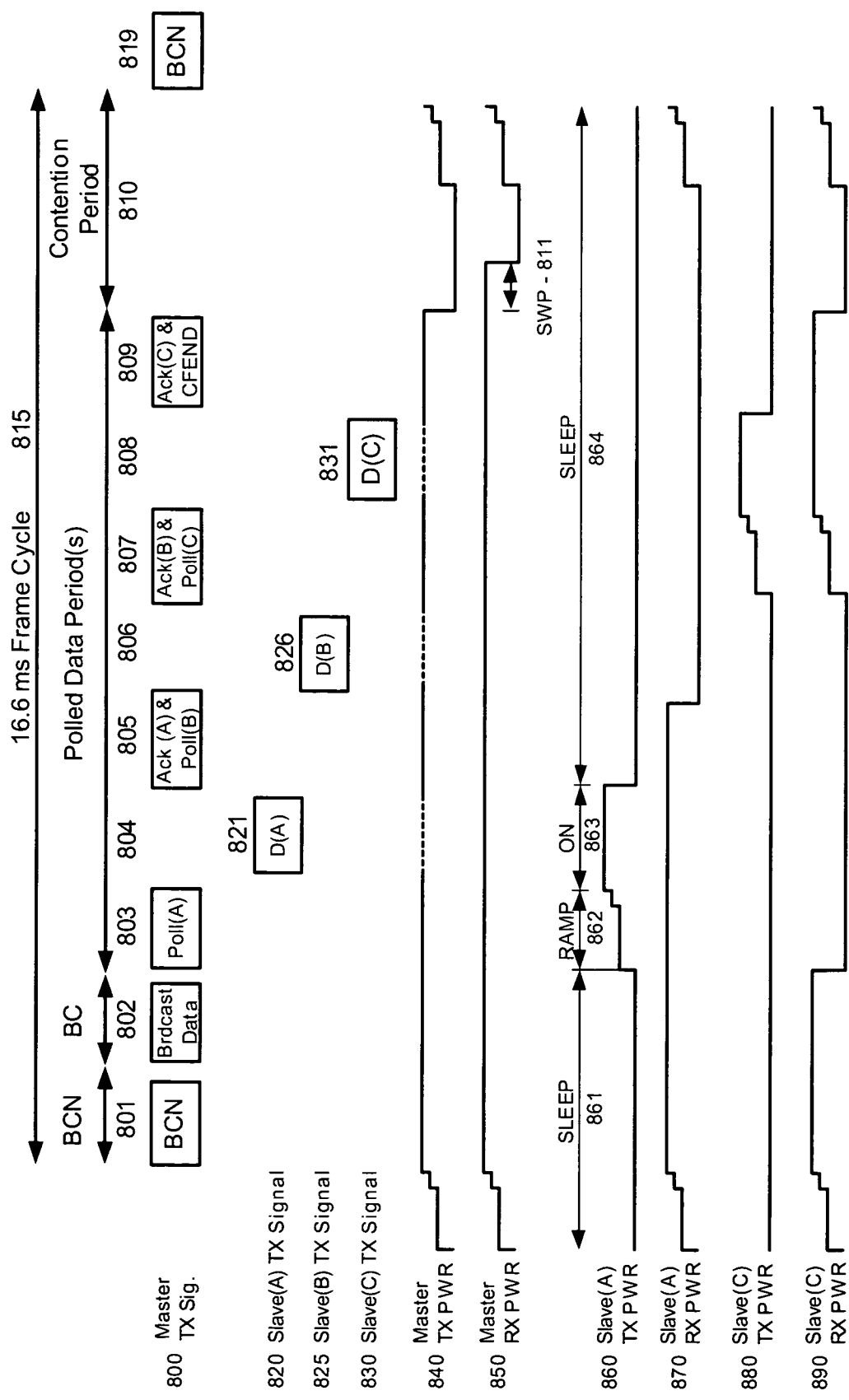
FIG. 5 is a signal timing diagram illustrating one example of operation according to an embodiment of the present invention.

FIG. 5 is a signal timing diagram illustrating one example of operation according to an embodiment of the present invention. The designations of Slave(A), Slave(B), and Slave(C) may correspond to the designations of FIG. 1A or 1B, for example. Row 800 shows the Master transmit signals, row 820 shows the Slave(A) transmit signals, row 825 shows the Slave(B) transmit signals, and row 830 shows the Slave(C) transmit signals. Row 840 shows the power state of the Master transmitter components and row 850 shows the power state of the Master receiver components. Row 860 shows the power state of the Slave(A) transmitter components and row 870 shows the power state of the Slave(A) receiver components. Row 880 shows the power state of the Slave(C) transmitter components and row 890 shows the power state of the Slave(C) receiver components.

The Master 324 begins the frame cycle 815 by transmitting a beacon during beaconing period 801. Slave(A), Slave (B), and Slave(C) receive the beacon from the Master 324 during the beaconing period 801. The Master 324 waits a period of time (for example a Short InterFrame Space (SIFS) period (not shown)) and then simultaneously transmits broadcast data 802 to Slave(A), Slave(B), and Slave(C) during the broadcast data period 802.

In either the Beacon transmission or the Broadcast data transmission, the Master notifies the Slaves of the polled-data period assignments. As illustrated in FIG. 5, the first polled-data period is assigned to Slave(A), the second polled-data period is assigned to Slave(B), and the third polled-data period is assigned to Slave(C). This order may change from frame cycle to frame cycle. The Master 324 waits a period (for example SIFS period) and then transmits a poll request to Slave(A) during the polling period 803 of the polled-data period. The Master 324 waits to receive data 821 from Slave(A) during the data transmission period 804 of the first polled-data period and, after a period, Slave(A) transmits Data(A) 821 to the Master. After the Master has correctly received Data(A) 821, it waits a period then transmits an Acknowledgement(A) to Slave(A) and a Poll (B) to Slave(B) during the combined acknowledgement period/polling period 805. During data transmission period 806, the Master receives Data(B) 826 from Slave(B). After the Master has correctly received Data(B) 826, it waits a period then transmits Acknowledgement(B) to Slave(B) and Poll(C) to Slave(C) during combined acknowledgement period/polling period 807. The Master receives Data(C) 831 from Slave(C) during data transmission period 808. After Master has correctly received Data(C) 831, it waits a period then transmits Acknowledgement(C) and CFEND during acknowledgement period 809.

Operation then enters the contention period. In the contention period, the Master waits to receive transmissions from new slaves requesting to join the WLAN. If no transmissions have been received within the new Slave Waiting Period 811, the Master ceases listening. At the end of the contention period 810, a new frame cycle commences with a new Beacon 819. In the new frame cycle the Master may be a different wireless terminal or may be the same wireless terminal.

Referring to both FIGS. 2 and 5, the processor 206 of each wireless terminal executes WLAN instructions (WIs) 214 to turn off components of the wireless terminal 200 to reduce the power drawn from battery 212. Typically, various components within the receiver functionality or transmitter functionality in the RF unit 204 and the processor 206 are controlled to conserve battery life. A related aspect is that various components and functions in the RF unit 204 may take ramp or stabilization time before operating properly or optimally for a period of time after power is applied. Thus components must be turned on for a period of time before needed.

An example of this type of power management is illustrated with reference to the Slave(A) transmitter power 860. Slave(A) is not required to transmit during the Beacon period 801 or the Broadcast data period 802 and its transmit components are turned off (sleep) 861 during these portions of the frame cycle 815. In preparation for transmitting Data(A) 821, Slave(A) begins to power on sub-components of its transmitter during Ramp 862. During Ramp 862, different sub-components are turned on at different times as illustrated in 862. For example, a Crystal Oscillator and a Synthesizer of the transmitter are turned on 1000 microseconds before needed and a Phase Lock Loop (PLL) of the transmitter is turned on 100 microseconds before needed. The transmitter is then optimally available for transmission of Data(A) 821. During transmission of Data(A) 821, the transmitter is fully on as indicated at 863. After the transmission Data(A) 821 is completed, the transmitter is returned to a sleep mode at 864. Such power control steps significantly reduce the average power drawn from the battery 212 in the wireless terminal 200. Similar operations are performed for the other components and functionality in the wireless terminal 200 such as in the RF receiver 218. Similar operations are performed for each other of the Slaves and for the Master.

A particular embodiment of the present invention rotates the order that the Slaves (Slave(A), Slave(B), and Slave(C)) are assigned polled-data periods so as to equalize the average amount of power drawn over multiple frame cycles 815. In a rotation of the Slave order, Slave(B) becomes Slave(A), Slave(C) becomes Slave(B), Slave(D) becomes Slave (C), and Slave(A) becomes Slave(D) in a last operation of the cycle. Such a rotation can occur every cycle or every "n" cycles. Further, this cycle may be extended for additional Slave devices.

Another particular embodiment of the present invention periodically swaps the role of the Master 324 with a device that was a Slave so as to equalize the average amount of power drawn over multiple frame cycles 815. This rotation is an integer multiple greater than one of the number of cycles that the Slaves rotate. The Master is swapped for Slave(A). The integer multiple is selected so that a different physical device is the old Slave(A) each time that the Master is swapped for Slave(A).

When a new Slave, for example Slave(D) wishes to enter the communication system, it does so by transmitting a message during the contention period 810. A further use of the contention period 810 is if a Slave does not receive an acknowledgement to its data message, the data message may have become corrupted during transmission. Thus, the data message must be retransmitted. The data message is not retransmitted during the contention free period since it would disturb the pattern when the other Slaves are expecting to wake up so as to receive and transmit their messages. Retransmissions are also transmitted during the contention period. In order to minimize potential collisions during the contention period, the Slaves retransmit in the order in which they were polled. Since it is unlikely that all of the Slaves must retransmit in the same cycle, a deferring mechanism is established to reduce the time the Master must wait with its receiver on. Slave(A) must wait a single period of time (for example a SIFS time) before transmitting after CFEND 809. Slave(B) must wait two periods of time (for example two SIFS times) before transmitting after CFEND 809. Slave(C) must wait three periods of time (for example three SIFS times) before transmitting after CFEND 809, and so on. Finally, a potential new Slave may transmit a new Slave message after another period of time (for example SIFS time) duration. Thus, the maximum time a Master needs to maintain its receiver without receiving a signal after CFEND 809 is period of time (for example SIFS) times the number of Slaves plus one in the frame cycle 815.

If more than one Slave must retransmit, each Slave decrements the number of period of time (for example a SIFS times) it waits by one for each retransmission that occurs. The next retransmission may then begin after the successful transmission and acknowledgement of the previous retransmission followed by the number of SIFS periods calculated above. Before transmitting, a Slave must check to make sure no other transmission is occurring. No retransmission may occur after the end of the current frame cycle 815. Before transmitting, a Slave must check to make sure that the duration of its transmission would exceed the end of the current frame cycle 815. Since the Slaves defer their retransmissions by different amounts of time, a time and power consuming collision is unlikely.

Another embodiment of the invention used in conjunction with the structured transmission times identifies the compression of the subsequent headers of the transmission messages according to information given during the Broadcast data 802. For example, the 6 octet MAC address within a header may be substituted with a single octet Master derived ID. The mapping is conveyed in the Broadcast data 802 and is used by the Slaves and Master for all message header transmissions in that frame cycle.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for managing peer-to-peer communications in a Wireless Local Area Network (WLAN) having a plurality of wireless terminals, one of which acts as a master at any time and remaining ones acting as slaves at any time, the method comprising:

communicating according to a frame cycle including a beaconing period, a broadcast data period, a plurality of polled data periods, and a contention period;

during the beaconing period, the master transmitting a beacon and each of the plurality of Slaves listening for the beacon;

during the broadcast data period, the master broadcasting data and each of the plurality of Slaves listening for the broadcast data;

during each polled data period, the master polling an assigned Slave and the assigned Slave transmitting data to the master if it has data to send;

during the contention period, a new Slave, if present, transmitting to the master;

during the plurality of polled data periods, non-assigned Slaves optionally powering down their transmitters and receivers; and during the contention period, the plurality of Slaves optionally powering down their transmitters and receivers.

2. The method of claim 1, further comprising alternating mastering duties among the plurality of wireless terminals according to a round-robin mastering cycle, the round-robin mastering cycle including a plurality of frame cycles, one of the plurality of wireless terminals acting as a master during each frame cycle and remaining ones of the plurality of wireless terminals acting as Slaves during each frame cycle.

3. The method of claim 2, further comprising none of the wireless terminals serving as the master for consecutive frame cycles of the round-robin mastering cycle.

4. The method of claim 2, further comprising none of the wireless terminals serving as the master for more than one frame cycle of the plurality of frame cycles of the round-robin mastering cycle.

5. The method of claim 2, further comprising one of the wireless terminals acting as the master for more than one consecutive frame cycle of the plurality of frame cycles of the round-robin mastering cycle.

6. The method of claim 1, wherein during both the beaconing period and the broadcast data period, at least one Slave of the plurality of the Slaves powers down its respective transmitter.

7. The method of claim 1, further comprising:

during the beaconing period, a Slave determining that it has been assigned a polled data period that immediately follows the broadcast data period;

the Slave powering down its transmitter during the beaconing period; and the Slave powering up its transmitter during the polled data period immediately following the broadcast data period.

8. The method of claim 1, further comprising:

during the beaconing period, a Slave determining that it has been assigned a polled data period that does not immediately follow the broadcast data period;

the Slave powering down its transmitter during the beaconing period;

the Slave powering down its receiver during the polled data period immediately following the broadcast data period; and the Slave powering up its transmitter and its receiver during its assigned polled data period.

9. The method of claim 1, further comprising, during the plurality of polled data periods, Slaves powering down their transmitters and receivers during unassigned polled data periods.

10. The method of claim 1, wherein the polled data period includes a polling period, a data transmission period, and an acknowledgement period, and the method further comprising:
an assigned Slave ramping up power to its transmitter during the polling period;
the assigned Slave fully powering its transmitter during the data transmission period; and
the Slave powering down its transmitter during the acknowledgement period.

11. The method of claim 10, further comprising the assigned Slave powering its receiver during the polling period, the data transmission period, and the acknowledgement period.

12. The method of claim 1, further comprising the plurality of Slaves powering up their receivers after the contention period in anticipation of the next beaconing period.

13. The method of claim 1, further comprising the master powering down its transmitter during the contention period.

14. The method of claim 13, further comprising the master powering down its receiver during the contention period after a new Slave-waiting period expires.

15. A system for managing peer-to-peer communications in a Wireless Local Area Network (WLAN) having a plurality of wireless terminals, the system comprising:
a plurality of frame cycles, one of the plurality of wireless terminals acting as a master
during each frame cycle and remaining ones of the plurality of wireless terminals acting
as Slaves during each frame cycle;
each frame cycle comprising a beaconing period, a broadcast data period, a plurality of polled data periods, and a contention period;
whereby during the beaconing period, the master transmits a beacon and each of the plurality of Slaves listens for the beacon;
whereby during the broadcast data period, the master broadcasts data and each of the plurality of Slaves listens for the broadcast data;
whereby during each polled data period, the master polls an assigned Slave and the assigned Slave transmits data to the master if it has data to send;
whereby during the contention period, a new Slave, if present, transmits to the master;
whereby during the plurality of polled data periods, non-assigned Slaves optionally power down their transmitters and receivers; and
whereby during the contention period, the plurality of Slaves optionally power down their transmitters and receivers.

16. The system of claim 15, wherein the plurality of frame cycles are organized in a round-robin mastering cycle in which the plurality of wireless terminals alternate mastering duties.

17. The system of claim 16, whereby none of the wireless terminals serving as the master for consecutive frame cycles of the round-robin mastering cycle.

18. The system of claim 16, whereby none of the wireless terminals serves as the master for more than one frame cycle of the plurality of frame cycles of the round-robin mastering cycle.

19. The system of claim 16, whereby one of the wireless terminals acts as the master for more than one consecutive frame cycle of the plurality of frame cycles of the round-robin mastering cycle.

20. The system of claim 15, whereby during both the beaconing period and the broadcast data period, at least one Slave of the plurality of the Slaves powers down its respective transmitter.

21. The system of claim 15, whereby:
during the beaconing period a Slave determines that it has been assigned a polled data period immediately following the broadcast data period;
the Slave powers down its transmitter during the beaconing period; and
the Slave powers up its transmitter during the polled data period that immediately follows the broadcast data period.

22. The system of claim 15, whereby:
during the beaconing period a Slave determines that it has been assigned a polled data period not immediately following the broadcast data period;
the Slave powers down its transmitter during the beaconing period;
the Slave powers down its receiver during the polled data period immediately following the broadcast data period;
the Slave powers up its transmitter and its receiver during its assigned polled data period.

23. The system of claim 15, whereby, during the plurality of polled data periods, Slaves power down their transmitters and receivers during unassigned polled data periods.

24. The system of claim 15, wherein the polled data period includes a polling period, a data transmission period, and an acknowledgement period, and whereby:
an assigned Slave ramps up power to its transmitter during the polling period;
the assigned Slave fully powers its transmitter during the data transmission period; and
the Slave powers down its transmitter during the acknowledgement period.

25. The system of claim 24, whereby the assigned Slave powers its receiver during the polling period, the data transmission period, and the acknowledgement period.

26. The system of claim 15, whereby the plurality of Slaves power up their receivers after the contention period in anticipation of the next beaconing period.

27. The system of claim 15, whereby the master powers down its transmitter during the contention period.

28. The system of claim 27, whereby the master powers down its receiver during the contention period after a new Slave-waiting period expires.

29. A system for managing peer-to-peer communications in a Wireless Local Area Network (WLAN) having a plurality of wireless terminals, the system comprising:
means for communicating according to a frame cycle including a beaconing period, a broadcast data period, a plurality of polled data periods, and a contention period;
means for, during the beaconing period, the master transmitting a beacon and each of the plurality of Slaves listening for the beacon;
means for, during the broadcast data period, the master broadcasting data and each of the plurality of Slaves listening for the broadcast data;
means for, during each polled data period, the master polling an assigned Slave and the assigned Slave transmitting data to the master if it has data to send;

means for, during the contention period, a new Slave, if present, transmitting to the master;

means for, during the plurality of polled data periods, non-assigned Slaves optionally powering down their transmitters and receivers; and means for, during the contention period, the plurality of Slaves optionally powering down their transmitters and receivers.

* * * * *